United States Patent
Fukuzaki et al.

(10) Patent No.: US 11,190,607 B2
(45) Date of Patent: Nov. 30, 2021

(54) COMMUNICATION MONITORING APPARATUS, COMMUNICATION MONITORING METHOD, AND COMPUTER-READABLE NON-TRANSITORY STORAGE MEDIUM

(71) Applicant: ALAXALA Networks Corporation, Kanagawa (JP)

(72) Inventors: Shouhei Fukuzaki, Kawasaki (JP); Masaya Arai, Kawasaki (JP)

(73) Assignee: ALAXALA NETWORKS CORPORATION, Kawasaki (JP)

( * ) Notice: Subject to any disclaimer, the term of this patent is extended or adjusted under 35 U.S.C. 154(b) by 0 days.

(21) Appl. No.: 17/155,129

(22) Filed: Jan. 22, 2021

(65) Prior Publication Data
US 2021/0243267 A1    Aug. 5, 2021

(30) Foreign Application Priority Data
Feb. 3, 2020   (JP) .............................. JP2020-016507

(51) Int. Cl.
*H04L 29/08*    (2006.01)
*H04L 29/12*    (2006.01)
*H04L 29/06*    (2006.01)

(52) U.S. Cl.
CPC .......... *H04L 67/28* (2013.01); *H04L 61/1511* (2013.01); *H04L 61/2503* (2013.01); *H04L 67/02* (2013.01); *H04L 67/42* (2013.01)

(58) Field of Classification Search
CPC ..... H04L 67/28; H04L 61/1511; H04L 67/42; H04L 67/02; H04L 61/2503

USPC ........................................................ 709/203
See application file for complete search history.

(56) References Cited

U.S. PATENT DOCUMENTS

| | | | |
|---|---|---|---|
| 7,792,942 B1* | 9/2010 | Regan | H04L 29/12273 709/223 |
| 2009/0234845 A1* | 9/2009 | DeSantis | H04L 63/10 |
| 2012/0275383 A1* | 11/2012 | Matsukawa | H04W 72/10 370/328 |
| 2013/0067572 A1* | 3/2013 | Muramoto | H04L 63/1408 726/22 |

(Continued)

FOREIGN PATENT DOCUMENTS

JP    2018-137687 A    8/2018

*Primary Examiner* — Tesfay Yohannes
(74) *Attorney, Agent, or Firm* — Mattingly & Malur, PC

(57) ABSTRACT

A monitoring apparatus holds extracted information including: extracted data from first communication between a proxy and a first network and from second communication between the proxy and a second network; and reception times of a target data, wherein the extracted data includes kinds of communication, sources and destinations of the target data in the first communication, and the sources in the second network and the destinations in the first network after the target data is relayed by the proxy in the second communication, the monitoring apparatus: for first extracted data of first kind of communication in the first communication, acquires second extracted data in the second communication whose reception time is coincidental time zone of the reception time of the first extracted data; and determines whether communication using the target data from which the acquired second extracted data is extracted is included in a series of end-to-end communication.

12 Claims, 15 Drawing Sheets

(56) References Cited

U.S. PATENT DOCUMENTS

| | | | | |
|---|---|---|---|---|
| 2015/0019637 | A1* | 1/2015 | Backholm | H04L 61/1511 |
| | | | | 709/203 |
| 2015/0271292 | A1* | 9/2015 | Tachi | H04L 63/029 |
| | | | | 709/203 |
| 2018/0279583 | A1* | 10/2018 | Yajima | A01K 11/004 |
| 2019/0173785 | A1* | 6/2019 | Kameyama | H04L 45/70 |
| 2019/0197140 | A1* | 6/2019 | Lee | G06F 16/2453 |
| 2020/0036645 | A1* | 1/2020 | Nagao | H04L 47/621 |

* cited by examiner

300

| HTTP Request | | |
|---|---|---|
| HEADER NAME | METHOD/FIELD | VALUE |
| Ether | Source MAC | 0000.5e00.5323 |
|  | Dest MAC | 0000.5e00.0001 |
| IP | Source IP | 192.0.2.230 |
|  | Dest IP | 192.0.2.254 |
| TCP | Source Port | 30080 |
|  | Dest Port | 8080 |
| HTTP | GET | http://www.example.com/ HTTP/1.1 |
|  | HOST | www.example.com |

| DNS Query | | |
|---|---|---|
| HEADER NAME | METHOD/FIELD | VALUE |
| Ether | ELLIPSIS |  |
| IP | Source IP | 198.51.100.1 |
|  | Dest IP | 203.0.113.1 |
| UDP | Source Port | 30053 |
|  | Dest Port | 53 |
| DNS Query | A record | www.example.com |

| DNS Response | | |
|---|---|---|
| HEADER NAME | METHOD/FIELD | VALUE |
| Ether | ELLIPSIS |  |
| IP | Source IP | 203.0.113.0 |
|  | Dest IP | 198.51.100.1 |
| UDP | Source Port | 53 |
|  | Dest Port | 30053 |
| DNS Response | IP | 203.0.113.3 |

| HTTP Request | | | |
|---|---|---|---|
| HEADER NAME | METHOD/FIELD | VALUE | |
| Ether | ELLIPSIS | | 331 |
| IP | Source IP | 198.51.100.1 | 332 |
| | Dest IP | 203.0.113.3 | 333 |
| TCP | Source Port | 30081 | 334 |
| | Dest Port | 80 | 335 |
| HTTP | GET | http://www.example.com/ HTTP/1.1 | 336 |
| | HOST | www.example.com | |

| SEARCH COMMUNICATION | | |
|---|---|---|
| WEB ACCESS TIME:: | 2019/1/18 20:00:00 ~ | 2019/1/18 20:00:30 |
| IP/PORT NUMBER OF TERMINAL:: | | |
| MAC ADDRESS OF TERMINAL: | | |
| IP/PORT NUMBER OF PROXY: | 198.51.100.1 | |
| IP/PORT NUMBER OF DESTINATION: | 203.0.113.3 | 80 |
| HOST NAME/PORT NUMBER OF DESTINATION: | example.com | |
| URL OF DESTINATION: | http://example.com/index.htm | (HTTP ONLY) |
| KIND OF COMMUNICATION: | HTTP | |

800

SEARCH

FIG.8

RESULT OF END-TO-END COMMUNICATION SEARCH

| WEB ACCESS TIME | Source IP | Source MAC | Destination IP | Destination HOST NAME: Port | Proxy Port | Destination URL | KIND |
|---|---|---|---|---|---|---|---|
| 2019/1/18 20:00:23 | 192.0.2.230 | 0000.5e00.5323 | 203.0.113.3 | example.com:80 | 30081 | http://example.com/ | HTTP |

*FIG.10*

HTTPS Request Connect — 1200

| HEADER NAME | METHOD/ FIELD | VALUE |
|---|---|---|
| Ether | Source MAC | 0000.5e00.5323 |
|  | Dest MAC | 0000.5e00.0001 |
| IP | Source IP | 192.0.2.230 |
|  | Dest IP | 192.0.2.254 |
| TCP | Source Port | 30080 |
|  | Dest Port | 8080 |
| HTTP | CONNECT | www.example.com:443 |
|  | HOST | www.example.com |

TLS Message — 1230

| HEADER NAME | METHOD/ FIELD | VALUE |
|---|---|---|
| Ether | ELLIPSIS |  |
| IP | Source IP | 198.51.100.1 |
|  | Dest IP | 203.0.113.3 |
| TCP | Source Port | 30053 |
|  | Dest Port | 443 |
| SSL | TLSv1.2 |  |

COMMUNICATION MONITORING APPARATUS, COMMUNICATION MONITORING METHOD, AND COMPUTER-READABLE NON-TRANSITORY STORAGE MEDIUM

CLAIM OF PRIORITY

The present application claims priority from Japanese patent application JP 2020-016507 filed on Feb. 3, 2020, the content of which is hereby incorporated by reference into this application.

BACKGROUND OF THE INVENTION

The present invention relates to a communication monitoring apparatus, a communication monitoring method, and a computer-readable non-transitory storage medium.

When connecting an intranet of a business entity or a school to the Internet, a relay apparatus such as a proxy server is provided in order to control the accesses to the external network and enhance the security by blocking intrusions from the external. However, administrating user communication becomes difficult; for example, the administrator in the external cannot directly locate the source of data because the data is transformed at the proxy server and accordingly, the data is different between the upstream and the downstream of the proxy server.

When an apparatus like a proxy server is provided, the administrator has to check the log of the apparatus in responding to a report from the external such as a security incident report. It takes large man-hours to locate the source of data. Further, the network administrator and the server administrator could be different; it is demanded that the data source be located with information in the network only.

JP 2018-137687 A (Patent Document 1) provides a background art in this field of technology. This patent document discloses: A packet analyzing program causes a computer of a packet analyzer for analyzing a communication route of packet data communicated from a first device to a second device interposing, between them, a relay device for relaying a network to function as: comparison analyzing means for comparing a payload of first packet data passing at an upstream side of the relay device with a payload of second packet data passing at a downstream side of the relay device; and assembling means for assembling a transmission source IP address of the first packet data and a destination IP address of the second packet data if a comparison result of the payloads accords (Abstract).

SUMMARY OF THE INVENTION

The art according to Patent Document 1 compares the payloads of the packets in the upstream of a proxy server with the payloads of the packets in the downstream of the proxy server to detect a match. The packets to be compared are all packets involved in the communication and therefore, the processing causes high load.

Accordingly, an aspect of this invention aims to locate the source of data with lower load with information in the network only, without analyzing the log of the proxy server.

An aspect of the present invention adopts the following configurations. A monitoring apparatus configured to monitor communication in a network separated by a proxy server into a first network and a second network, the proxy server being configured to relay communication between an apparatus included in the second network and an apparatus included in the first network in accordance with a request from the apparatus in the second network, and the monitoring apparatus comprising: a processor; and a memory, wherein the memory holds extracted information including: extracted data extracted from monitoring target data used for predetermined kinds of communication in first communication between the proxy server and an apparatus in the first network and second communication between the proxy server and an apparatus in the second network; and times of reception of the monitoring target data from which the extracted data is extracted, wherein the extracted data includes the kinds of communication for which the monitoring target data is used, the sources and the destinations of the monitoring target data in the first communication, and the sources in the second network and the destinations in the first network after the monitoring target data is relayed by the proxy server of the monitoring target data in the second communication, and wherein the processor is configured to: determine whether the extracted information includes first extracted data extracted from monitoring target data used for first kind of communication in the first communication; acquire second extracted data extracted from monitoring target data in the second communication whose time of reception is within a predetermined time difference from the time of reception of the first extracted data with reference to the extracted information, in a case of determining that the extracted information includes the first extracted data; and determine whether communication using the monitoring target data from which the acquired second extracted data is extracted is included in a series of end-to-end communication, based on the source and the destination indicated by the first extracted data and the destination in the first network indicated by the acquired second extracted data.

The aspect of the present invention can locate the source of data with lower load with information in the network only, without analyzing the log of the proxy server.

The problems to be solved by this invention, the configurations, and the advantageous effects other than those described above according to this invention are made clear based on the following description of the embodiments.

BRIEF DESCRIPTION OF THE DRAWINGS

The present invention can be appreciated by the description which follows in conjunction with the following figures, wherein:

FIG. 3A is an example of the format of a part of an HTTP request packet according to embodiment 1;

FIG. 3B is an example of the format of a part of a DNS query packet according to embodiment 1;

FIG. 3C is an example of the format of a part of an DNS response packet according to embodiment 1;

FIG. 3D is an example of the format of a part of an HTTP request packet according to embodiment 1;

FIG. 8 is a configuration example of a search screen for conducting an end-to-end communication search according to embodiment 1;

FIG. 10 is a configuration example of a screen for displaying a result of the end-to-end communication search according to embodiment 1;

FIG. 12A is an example of the format of a part of an HTTPS request packet according to embodiment 2;

FIG. 12B is an example of the format of a part of a TLS message packet according to embodiment 2;

DETAILED DESCRIPTION OF THE EMBODIMENTS

Figure 1:
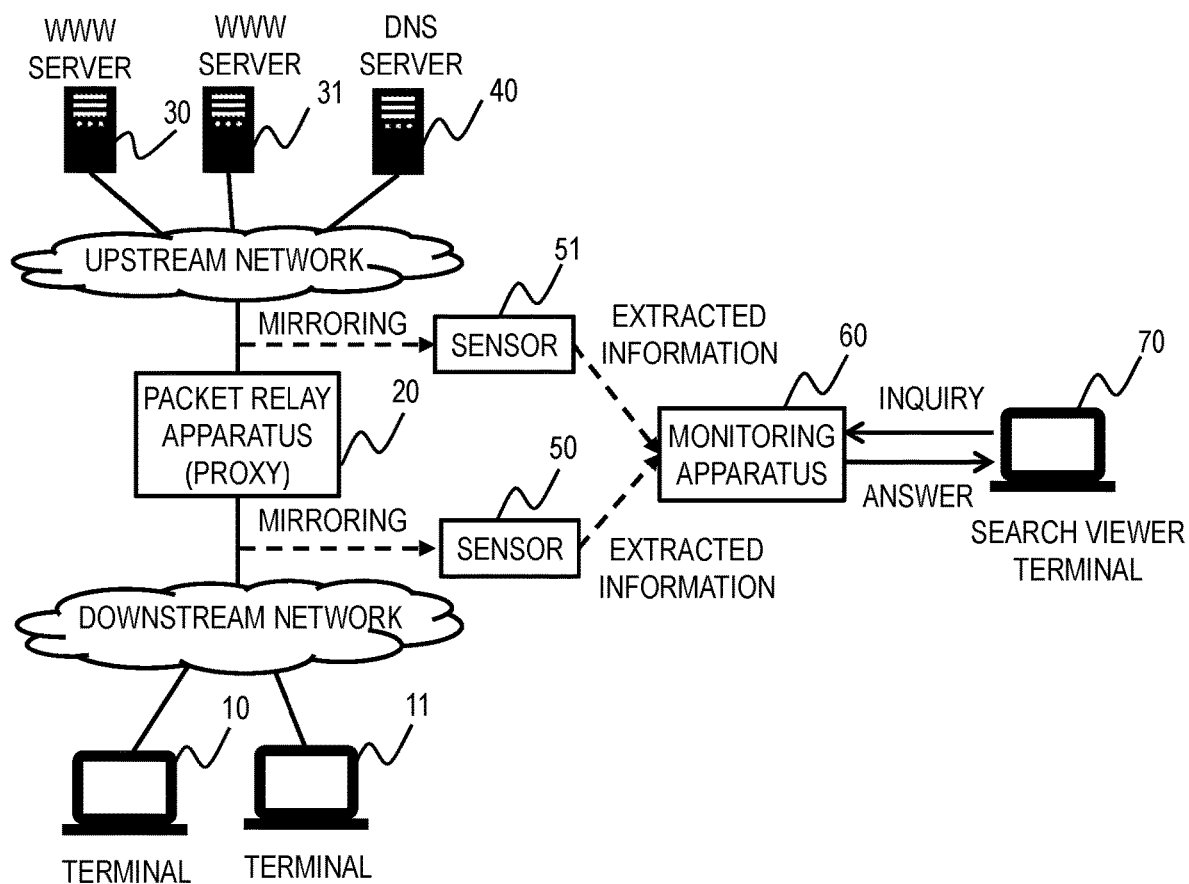
FIG. 1 is an explanatory diagram of a configuration example of a network according to embodiment 1.

Embodiments of the present invention are described referring to the accompanying drawings in the following. The same reference numerals represent the same components or equivalent components through the drawings. For the sake of descriptive convenience, suffixes may be added to reference numerals to distinguish the same components or equivalent components from one another.

The communication monitoring system in the embodiments of this invention mirrors communication in the upstream and the downstream of a proxy server and extracts the values indicating the characteristics of the communication from the mirrored data, if the data used in the communication is transformed at the proxy server. The communication monitoring system assembles the communication separated at the proxy server into a series of communication based on the extracted values and holds information on the communication from a point to a point as a record of end-to-end communication. Further, the communication monitoring system searches the communication records with a search condition such as a destination IP address; the user can easily locate the source of designated data.

Embodiment 1

This embodiment describes an example that mirrors HTTP communication performed via a proxy in the upstream and the downstream of the proxy, extracts information with a sensor, and stores the information to a monitoring apparatus as storable and searchable information on end-to-end communication in order to locate the initiator of the communication easily. Although this embodiment describes IPv4 communication, it is also applicable to IPv6 communication.

FIG. 1 is an explanatory diagram of a configuration example of a network. In the system in FIG. 1, HTTP communication is performed between a terminal 10 or 11 as an initiator of the communication and a World Wide Web (WWW) server 30 or 31 via a packet relay apparatus 20 that separates the network. The packet relay apparatus 20 works as a proxy server; the term "proxy" in this embodiment means the packet relay apparatus 20.

In this description, the part of the network closer to the terminals from the packet relay apparatus 20 is referred to as downstream network and the part of the network closer to the servers from the packet relay apparatus 20 is referred to as upstream network.

The downstream network includes the terminals 10 and 11, the packet relay apparatus 20, and a sensor 50. The terminals 10 and 11 can be computers such as personal computers (PCs). The sensor 50 mirrors the packets transmitted between the terminal 10 or 11 and the packet relay apparatus 20, extracts information from the mirrored packets, and sends the extracted information to a monitoring apparatus 60. The information to be extracted will be described later.

The upstream network includes the WWW servers 30 and 31, a Domain Name System (DNS) server 40, and a sensor 51. The sensor 51 mirrors the packets transmitted between the packet relay apparatus 20 and the WWW server 30 or 31 and the packets transmitted between the packet relay apparatus 20 and the DNS server 40, extracts information from the mirrored packets, and sends the extracted information to the monitoring apparatus 60.

The monitoring apparatus 60 holds information on communication between the terminal 10 or 11 as an initiator (source) and the WWW server 30 or 31 as a target (destination) as records of end-to-end communication based on the received extracted information.

A search viewer terminal 70 requests the monitoring apparatus 60 to locate the source of specific communication from the stored end-to-end communication records by sending search conditions and displays the search result received from the monitoring apparatus 60. The search viewer terminal 70 can be a computer such as a PC.

The number of terminals, the number of WWW servers, the number of DNS servers, and the number of sensors in the network system in FIG. 1 are not limited to the examples in FIG. 1 but can be any numbers. Particularly, the network configuration example in FIG. 1 includes the sensor 50 in the downstream network and the sensor 51 in the upstream network, but the network system can include only one sensor configured to mirror the packets in the upstream network and the downstream network.

Figure 2:
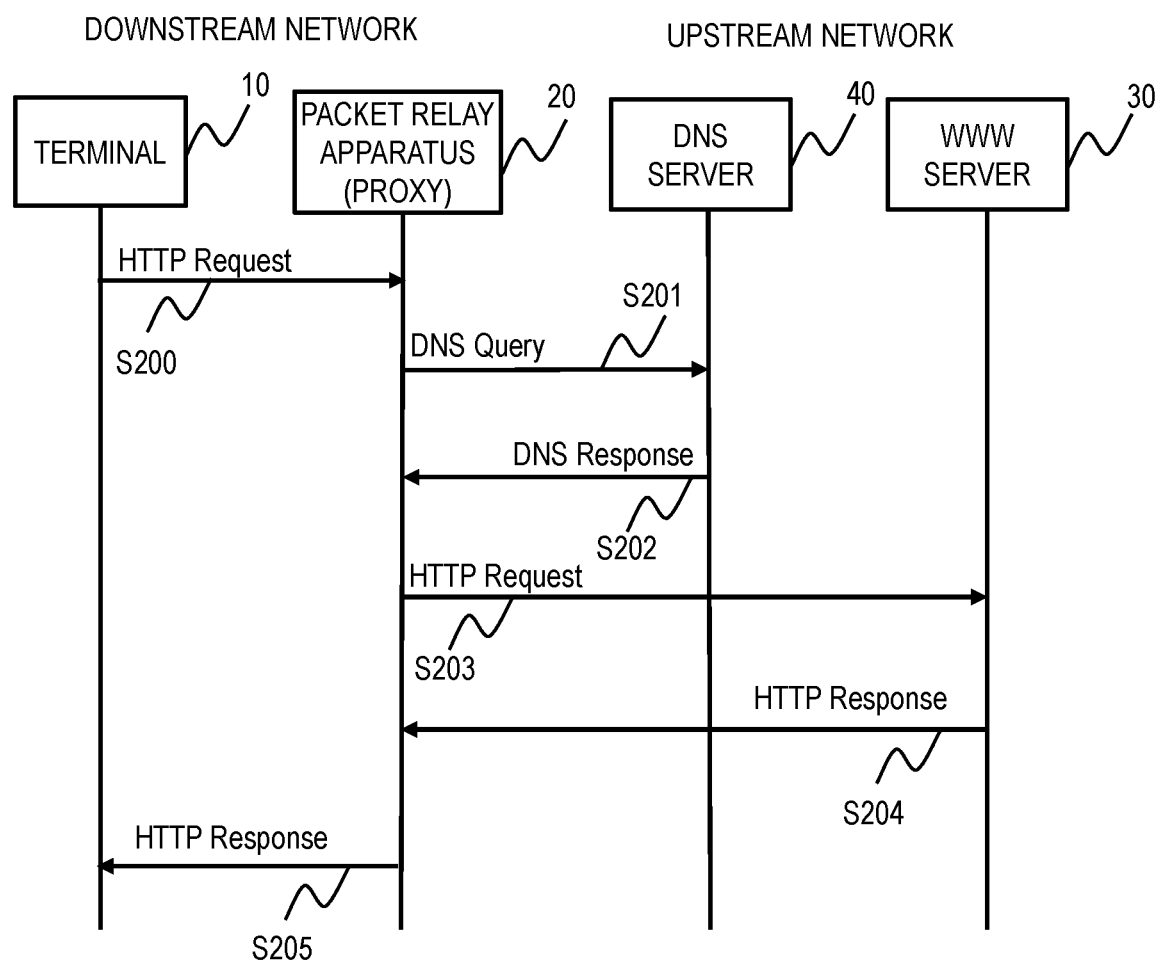
FIG. 2 is a sequence diagram illustrating an example of a flow of HTTP communication according to embodiment 1.

FIG. 2 is a sequence diagram illustrating an example of a flow of HTTP communication. FIG. 2 illustrates an example of HTTP communication from the terminal 10 to the WWW server 30 in the system illustrated in FIG. 1. TCP handshaking is omitted from FIG. 2. The packet format in each transmission will be described later with reference to FIG. 3.

In starting HTTP communication, the terminal 10 sends an HTTP request to the packet relay apparatus 20 and the packet relay apparatus 20 receives the HTTP request (S200).

The packet relay apparatus 20 generates a DNS query by setting the host information of the WWW server 30 to the A record based on the host information in the HTTP header of the received HTTP request and sends the generated DNS query to the DNS server 40 in order to find out the IP address of the WWW server 30 of the destination. The DNS server 40 receives the DNS query (S201).

The DNS server 40 generates a DNS response including the IP address corresponding to the host information in the A record and sends the generated DNS response to the packet relay apparatus 20 in order to respond the IP address of the host specified by the DNS query. The packet relay apparatus 20 receives the DNS response (S202).

Since the packet relay apparatus 20 is notified of the IP address of the WWW server 30 to be the destination, the packet relay apparatus 20 sends an HTTP request to the WWW server 30. The WWW server 30 receives the HTTP request (S203).

The WWW server 30 sends an HTTP response to the packet relay apparatus 20 in order to send the requested content. The packet relay apparatus 20 receives the HTTP response (S204).

The packet relay apparatus 20 sends an HTTP response to the terminal 10 in order to relay the response to the HTTP requester or the terminal 10. The terminal 10 receives the HTTP response (S205). The series of HTTP communication ends with this step.

FIGS. 3A to 3D are examples of the formats of the packets to be extracted by the sensors 50 and 51. FIGS. 3A to 3D include only the minimum requirements for the explanation of this embodiment among the headers and methods/fields included in the packets.

FIG. 3A is an example of the format of a part of an HTTP request packet 300 to be sent from the terminal 10 to the packet relay apparatus 20 at Step S200. The HTTP request packet 300 includes an Ethernet™ header (hereinafter, also referred to as Ether header), an IP header, a TCP header, and an HTTP header.

The Ether header of the HTTP request packet 300 includes a source MAC address 301 and a destination (dest) MAC address 302. The IP header of the HTTP request packet 300 includes a source IP address 303 and a destination IP address 304.

The TCP header of the HTTP request packet 300 includes a source port number 305 and a destination port number 306. The HTTP header of the HTTP request packet 300 includes a GET 307 and a HOST 308.

FIG. 3B is an example of the format of a part of a DNS query packet 310 to be sent from the packet relay apparatus 20 to the DNS server 40 at Step S201. The DNS query packet 310 includes an Ether header, an IP header, a UDP header, and a DNS query header.

The IP header of the DNS query packet 310 includes a source IP address 311 and a destination IP address 312. The UDP header of the DNS query packet 310 includes a source port number 313 and a destination port number 314. The DNS query header of the DNS query packet 310 includes an A record 315.

FIG. 3C is an example of the format of a part of an DNS response packet 320 to be sent from the DNS server 40 to the packet relay apparatus 20 at Step S202. The DNS response packet 320 includes an Ether header, an IP header, a UDP header, and a DNS response header.

The IP header of the DNS response packet 320 includes a source IP address 321 and a destination IP address 322. The UDP header of the DNS response packet 320 includes a source port number 323 and a destination port number 324. The DNS response header of the DNS response packet 320 includes an IP address 325.

FIG. 3D is an example of the format of a part of an HTTP request packet 330 to be sent from the packet relay apparatus 20 to the WWW server 30 at Step S203. The HTTP request packet 330 includes an Ether header, an IP header, a TCP header, and an HTTP header.

The IP header of the HTTP request packet 330 includes a source IP address 331 and a destination IP address 332. The TCP header of the HTTP request packet 330 includes a source port number 333 and a destination port number 334. The HTTP header of the HTTP request packet 330 includes a GET 335 and a HOST 336.

Figure 4:
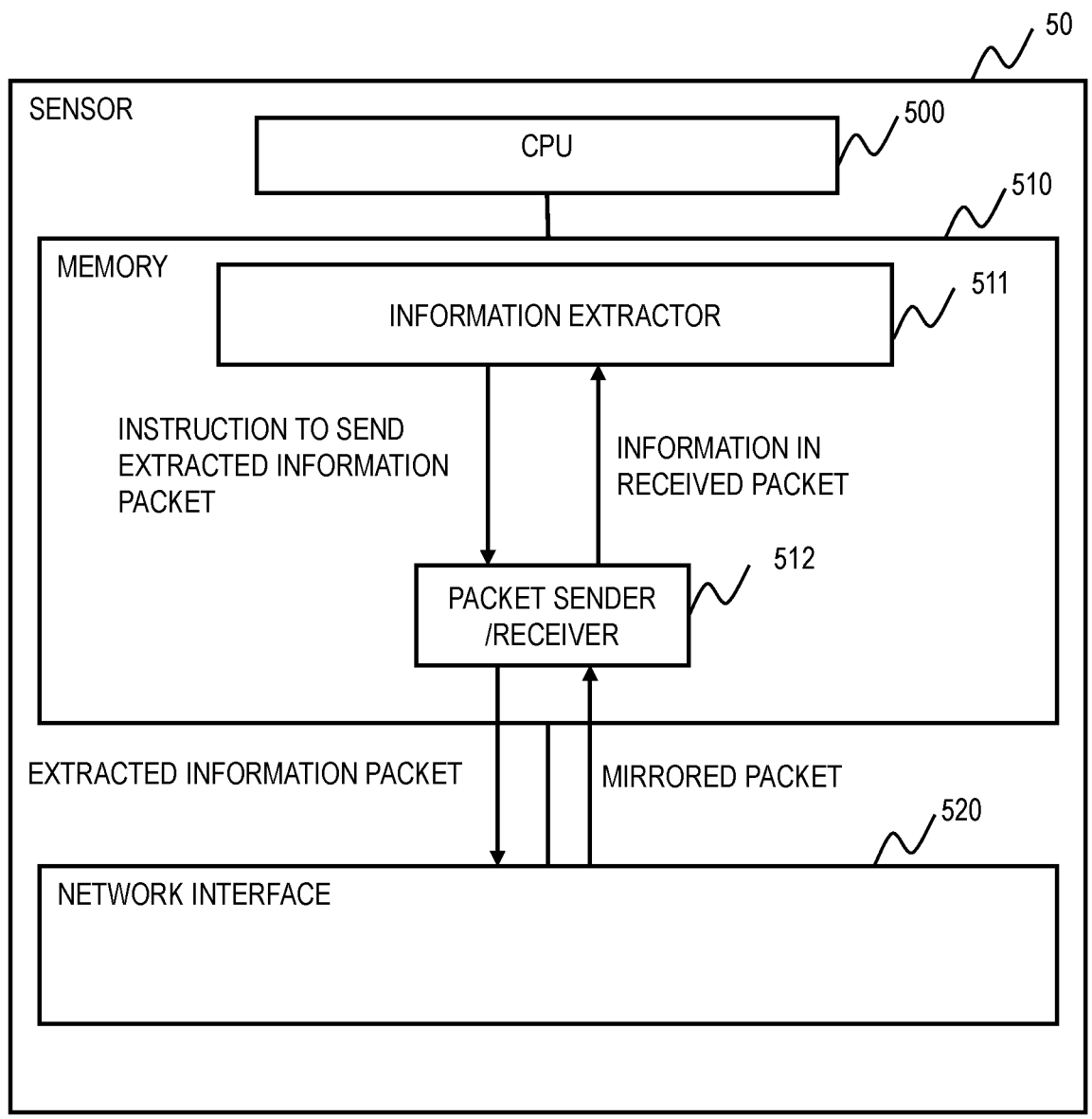
FIG. 4 is a block diagram illustrating an example of the internal configuration of a sensor according to embodiment 1.

FIG. 4 is a block diagram illustrating an example of the internal configuration of the sensor 50. This example of the internal configuration also applies to the sensor 51 and accordingly, description of the sensor 51 is omitted here. The sensor 50 includes a CPU 500, a memory 510, and a network interface 520 interconnected with one another by internal communication lines such as a bus.

The CPU 500 includes a processor and executes a program stored in the memory 510. The memory 510 includes a ROM and a RAM. The ROM is a non-volatile storage element and the RAM is a volatile storage element. The ROM stores an invariable program (for example, a BIOS). The RAM is a high-speed volatile storage element such as a dynamic random access memory (DRAM). The RAM stores a program to be executed by the processor and data to be used to execute the program on a temporary basis.

The sensor 50 can include an input interface and an output interface. The input interface is connected with input devices such as a keyboard and a mouse to receive input from the operator. The output interface is connected with output devices such as a display device and a printer to output the result of execution of a program in a form understandable for the operator.

The network interface 520 controls communication with other apparatuses in accordance with a predetermined protocol. The network interface 520 has a port to send and receive various kinds of packets in accordance with instructions from the CPU 500. Specifically, the network interface 520 receives packets mirrored in the downstream network and forwards them to the packet receiver/sender 512 as necessary.

The network interface 520 also sends extracted information packets to the monitoring apparatus 60 in accordance with instructions from the packet receiver/sender 512. Although not shown in FIG. 4, the network interface 520 and the network interface of the monitoring apparatus 60, which will be described later, can have multiple ports.

The memory 510 includes an information extractor 511 and a packet receiver/sender 512. The information extractor 511 receives information in a received packet (which can be a received packet itself) from the packet receiver/sender 512, identifies the kind of the received packet, and extracts information necessary to assemble the information into a record of end-to-end communication in accordance with the identified kind of the packet. The information extractor 511 notifies the packet receiver/sender 512 of the extracted information and the time of reception of the packet.

The information to be extracted by the information extractor 511 is different depending on the kind of the received packet; the details thereabout will be described later with reference to FIG. 5. Extracting information at the information extractor 511 reduces the traffic volume between the sensor 50 and the monitoring apparatus 60 and further, saves the storage capacity of the monitoring apparatus 60 because the monitoring apparatus 60 does not need to store the remaining information.

Upon receipt of a mirrored packet from a port, the packet receiver/sender 512 notifies the information extractor 511 of the information in the received packet (which can be the received packet itself) and the time of reception of the packet. Further, the packet receiver/sender 512 includes the information extracted by the information extractor 511 into a packet and instructs the network interface 520 to send the packet to the monitoring apparatus 60.

The information extractor 511 and the packet receiver/sender 512 of the sensor 50 are implemented by programs executed by the CPU 500 of the sensor 50. For example, the CPU 500 of the sensor 50 operates in accordance with an information extraction program loaded on the memory 510 to function as the information extractor 511 and operates in accordance with a packet receiving/sending program loaded on the memory 510 to function as the packet receiver/sender 512. The same applies to the relation between function units included in the monitoring apparatus 60 and programs to be described later.

The sensor 50 can further include an auxiliary storage device. The auxiliary storage device is a non-volatile storage device having a large capacity, such as a magnetic storage device (HDD) or a flash memory (SSD), and stores programs to be executed by the CPU 500 and the data to be used in executing the programs.

The programs to be executed by the CPU 500 are provided to the sensor 50 through a computer-readable non-transitory removable storage medium (such as a CD-ROM or a flash memory) or a network and stored to the non-volatile auxiliary storage device of a non-transitory storage medium or the memory 510. Accordingly, the sensor 50 can have an interface to retrieve data from a removable medium.

Information used by the apparatuses in the network in this embodiment does not depend on the data structure; it can be expressed in any data structure. The information can be stored in a data structure appropriately selected from a table, a list, a database, a queue, and the like.

Each apparatus included in the network in this embodiment is a computer system configured with one physical computer or a plurality of physical or logical computers; it can operate on a different thread of the same computer or a virtual machine configured with a plurality of physical computer resources. A part or all of the processing of the function units included in the sensors 50 and 51, and the communication monitoring apparatus can be executed by hardware such as an application specific integrated circuit (ASIC).

Figure 5:
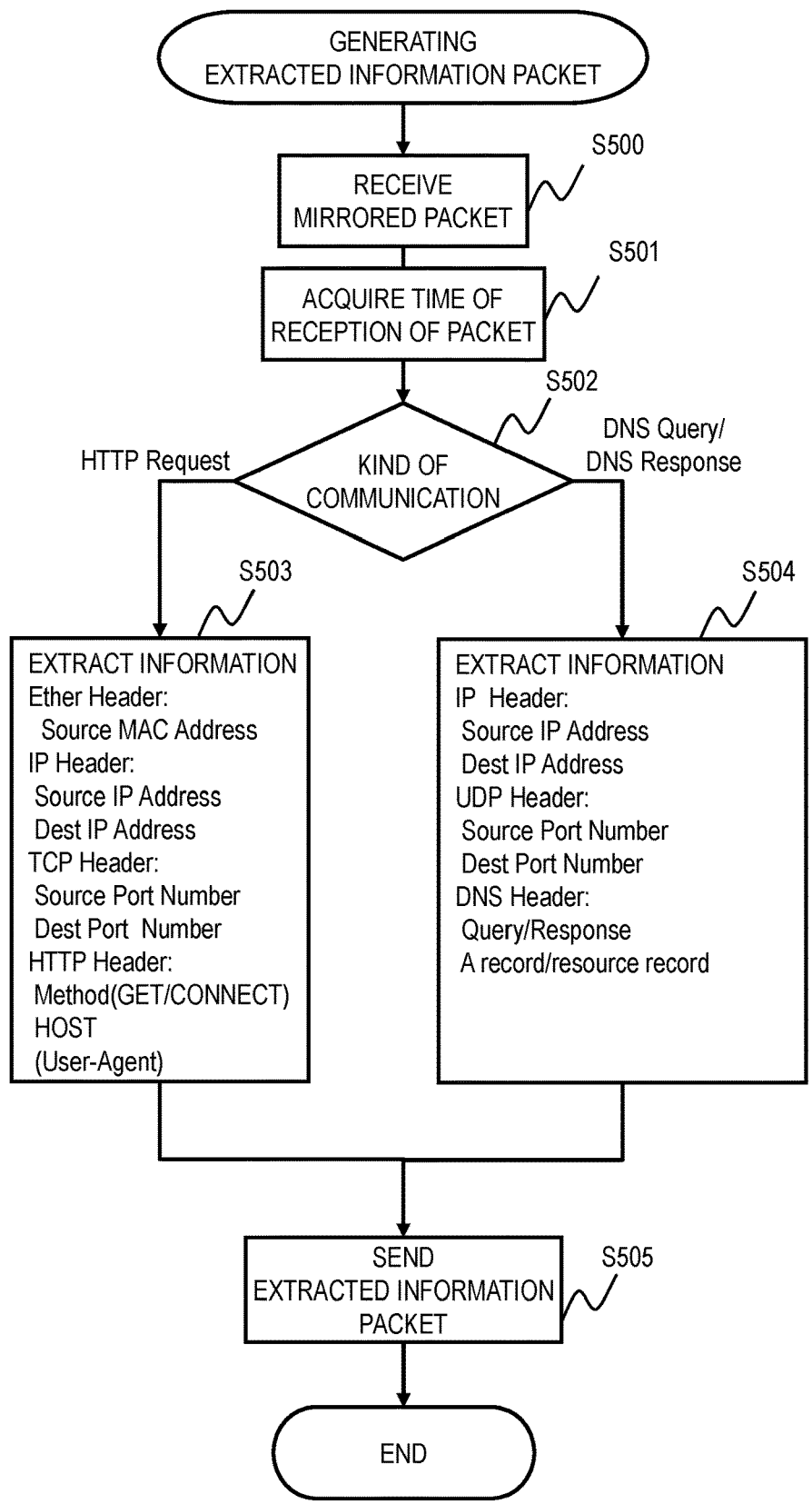
FIG. 5 is a flowchart of an example of processing of generating an extracted information packet according to embodiment 1.

FIG. 5 is a flowchart of an example of processing of the sensor 50 to generate an extracted information packet. Although this section describes processing of the sensor 50, the same description applies to the processing of the sensor 51 to generate an extracted information packet, if the term downstream network in the following description is replaced with the term upstream network. Accordingly, description of the processing of the sensor 51 is omitted here.

Each time the packet receiver/sender 512 receives a mirrored packet from the downstream network (S500), the processing of Step S501 and the subsequent steps is applied to the received packet. The packet receiver/sender 512 acquires the time of reception of the packet (S501) and notifies the information extractor 511 of the information in the packet (which can be the received packet itself) and the time of reception.

The information extractor 511 identifies the kind of communication with reference to the header of the received packet (S502). If determining that the kind of communication for which the received packet is used is HTTP request (S502: HTTP request), the information extractor 511 extracts HTTP request information (S503).

In extracting HTTP request information at Step S503, the information extractor 511 extracts the source MAC address in the Ether header, the source IP address and the destination IP address in the IP header, and the GET and the HOST in the HTTP header from the received packet.

The information extractor 511 at Step S503 can further extract information that can be used to narrow down communication, such as a User-Agent included in the received packet of an HTTP request.

If determining the kind of communication for which the received packet is used is DNS query or DNS response (S502: DNS query or DNS response), the information extractor 511 extracts DNS information (S504).

In extracting DNS information at Step S504, the information extractor extracts the source IP address and the destination IP address in the IP header, the source port number and the destination port number in the UDP header, and the A record in the DNS query header or the resource record in the DNS response header from the received packet.

After Step S503 or S504, the packet receiver/sender 512 generates an extracted information packet including the information extracted by the information extractor 511 and the time of reception acquired at Step S501. The network interface 520 sends the extracted information packet to the monitoring apparatus 60 (S505).

Figure 6:
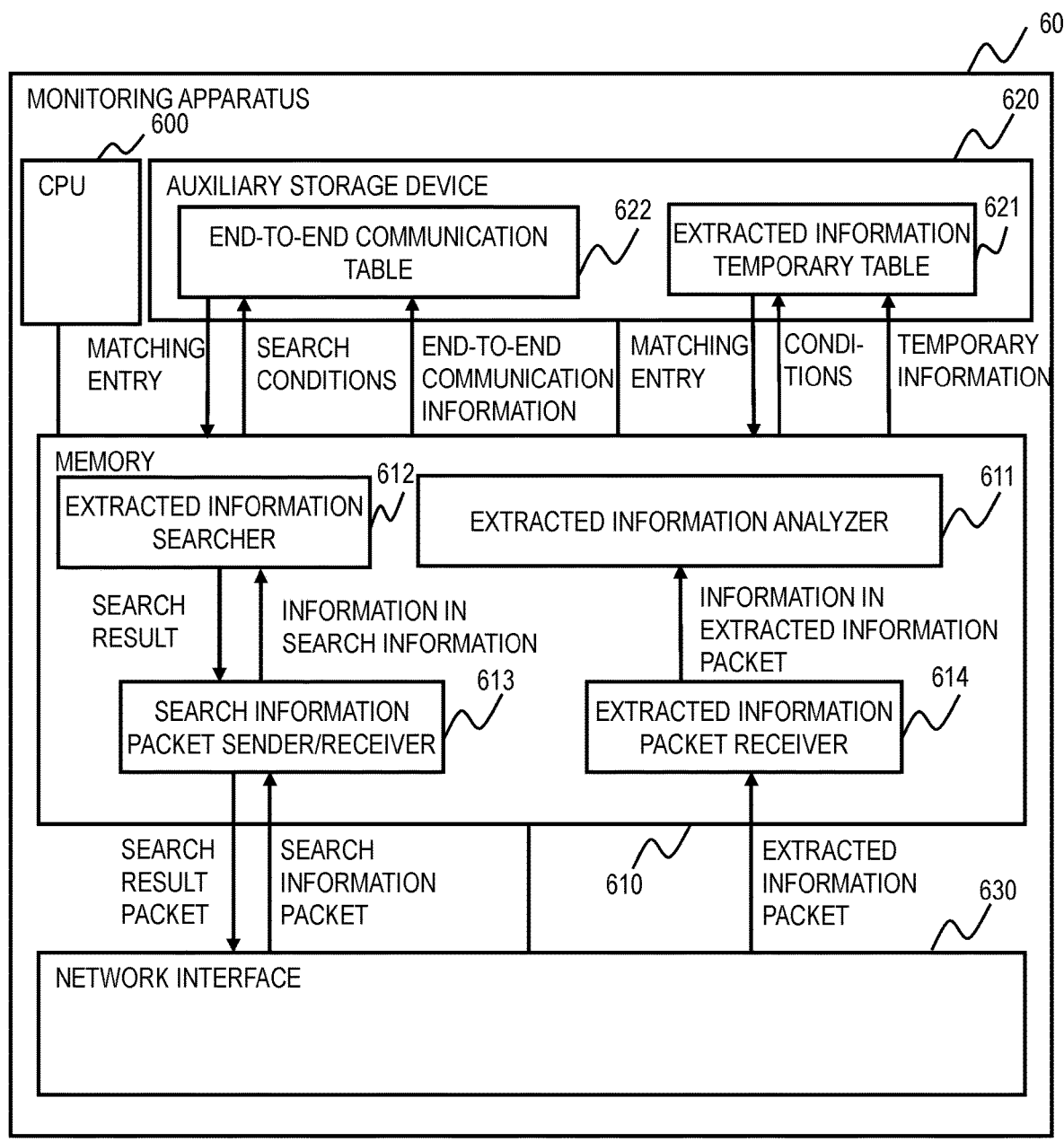
FIG. 6 is a block diagram illustrating an example of an internal configuration of a monitoring apparatus according to embodiment 1.

FIG. 6 is a block diagram illustrating an example of the internal configuration of the monitoring apparatus 60. The monitoring apparatus 60 includes a CPU 600, a memory 610, an auxiliary storage device 620, and a network interface 630 interconnected by internal communication lines such as a bus.

The description of the CPU 600, the memory 610, and the network interface 630 as hardware is omitted here because the description of the CPU 500, the memory 510, and the network interface 520 is applicable. The memory 610 includes an extracted information analyzer 611, an extracted information searcher 612, a search information packet receiver/sender 613, and an extracted information packet receiver 614.

The extracted information analyzer 611 receives information in an extracted information packet (which can be the extracted information packet itself) forwarded from the extracted information packet receiver 614 and stores the information to an extracted information temporary table 621. The extracted information analyzer 611 analyzes the extracted information stored in the extracted information temporary table 621 to determine whether the extracted information can be assembled into any end-to-end communication. If some end-to-end communication exists, the extracted information analyzer 611 stores an entry of the communication to an end-to-end communication table 622.

The extracted information packet receiver 614 receives an extracted information packet from the network interface 630 and forwards the extracted information to the extracted information analyzer 611. The extracted information searcher 612 receives search information from the search information packet receiver/sender 613, searches the end-to-end communication table 622 for an entry of end-to-end communication matching the search conditions, and forwards the search result to the search information packet receiver/sender 613.

The search information packet receiver/sender 613 receives a search information packet from the network interface 630 and forwards the search conditions specified in the search information packet to the extracted information searcher 612. The search information packet receiver/sender 613 also receives a search result from the extracted information searcher 612, assembles information in the search result into a packet, and instructs the network interface 630 to send the generated packet to the search viewer terminal 70.

The auxiliary storage device 620 is a non-volatile storage device having a large capacity, such as a magnetic storage device (HDD) or a flash memory (SSD), and stores programs to be executed by the CPU 600 and the data to be used in executing the programs. In other words, the programs are retrieved from the auxiliary storage device 620, loaded to the memory 610, and executed by the CPU 600.

The auxiliary storage device 620 stores the extracted information temporary table 621 and the end-to-end communication table 622. The extracted information temporary table 621 stores information extracted by the sensor 50 from the received packets. The end-to-end communication table 622 stores entries representing end-to-end communication in the communication in the upstream network and the downstream network.

The network interface 630 receives extracted information packets from the sensors 50 and 51 and notifies the extracted information packet receiver 614 of the received extracted information packets as appropriate. The network interface 630 also receives search information packets specifying search conditions from the search viewer terminal 70 and notifies the search information packet receiver/sender 613 of the received search information packets as appropriate. The network interface 630 further sends the search result packets received from the search information packet receiver/sender 613 to the search viewer terminal 70.

Figure 7:
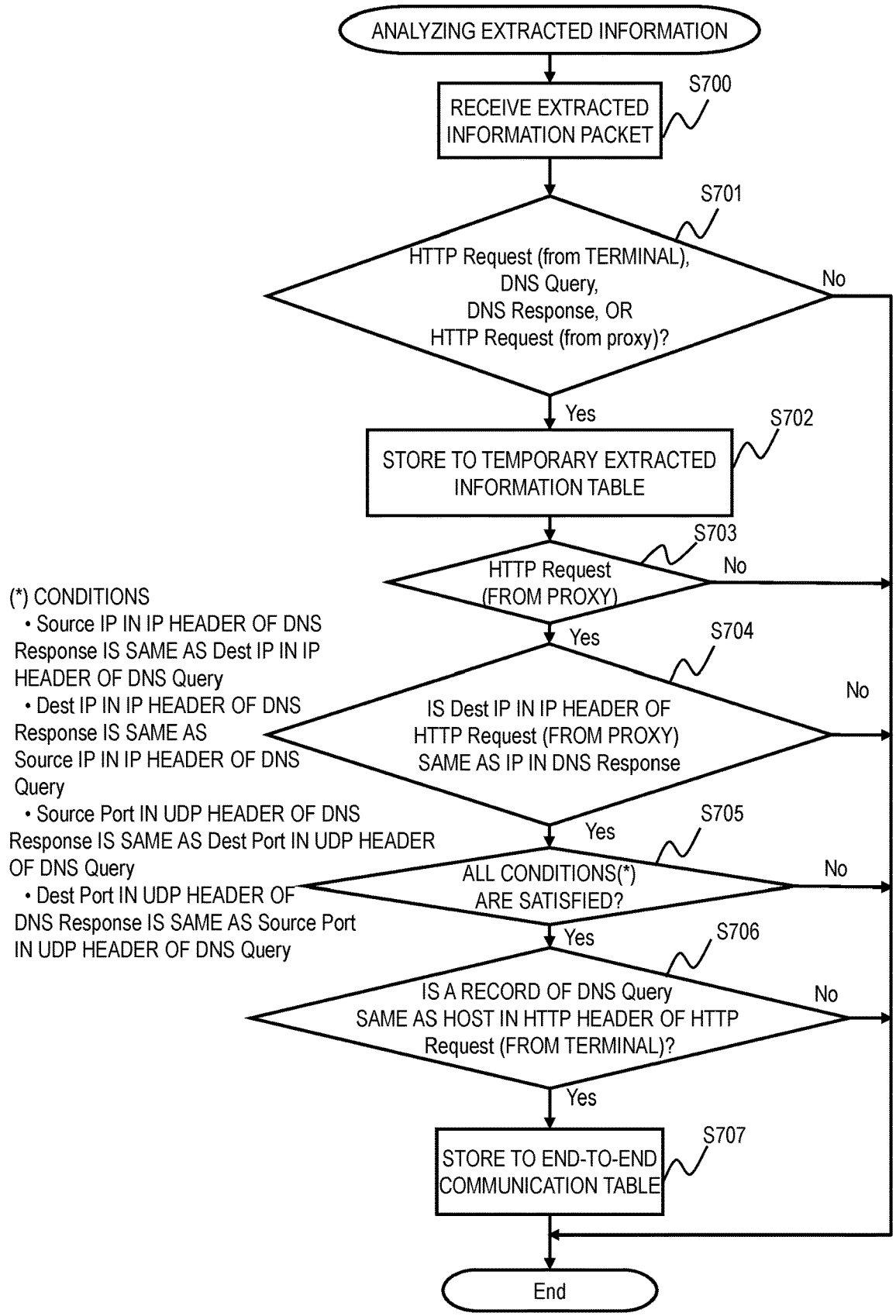
FIG. 7 is a flowchart of an example of processing of analyzing extracted information according to embodiment 1.

FIG. 7 is a flowchart of an example of processing of the monitoring apparatus 60 to analyze extracted information. Each time the extracted information packet receiver 614 receives an extracted information packet (S700), the processing at Step 701 and the subsequent steps is applied to the received extracted information packet.

The extracted information analyzer 611 determines whether the extracted information packet is generated from any one of an HTTP request packet 300, a DNS query packet 310, a DNS response packet 320, and an HTTP request packet 330, with reference to the extracted information (S701).

If determining that the extracted information packet is generated from one of these packets (S701: Yes), the extracted information analyzer 611 stores the extracted information packet to the extracted information temporary table 621 (S702). If not determining that the extracted information packet is generated from any one of these packets (S701: No), the extracted information analyzer 611 terminates the processing to analyze the extracted information because the extracted information packet is not related to end-to-end communication.

The extracted information analyzer 611 determines whether the extracted information packet is generated from an HTTP request packet 330 with reference to the extracted information packet (S703). Although an HTTP request packet 300 sent from the terminal 10 and an HTTP request packet 330 sent from the proxy have the same format, the extracted information analyzer 611 determines that the HTTP request packet is an HTTP request packet 330 sent from the proxy with reference to the source IP address, for example.

If not determining that the extracted information packet is generated from an HTTP request packet 330 (S703: No), the extracted information analyzer 611 terminates the processing to analyze the extracted information because the extracted information packet is generated in the course of end-to-end communication and cannot be assembled into end-to-end communication.

If determining that the extracted information packet is generated from an HTTP request packet 330 (S703: Yes), the extracted information analyzer 611 determines whether all determination conditions in Steps S704, S705, and S706 are satisfied with reference to the extracted information packet and the extracted information temporary table 621. If all conditions are satisfied, the extracted information analyzer 611 determines that the extracted information can be assembled into end-to-end communication.

The determination condition at Step S704 is that the extracted information temporary table 621 includes an entry of an extracted information packet generated from a DNS response packet 320 that is received in the same timeslot as the foregoing HTTP request packet 330 and includes the same IP address 325 as the destination IP address 332 in the IP header of this HTTP request packet 330.

The determination conditions at Step S705 are that the following (1), (2), (3), (4), and (5) are all satisfied.

(1) The extracted information temporary table 621 includes an entry of an extracted information packet generated from a DNS query packet 310 received in the same timeslot as the HTTP request packet 330.

(2) The source IP address 321 in the IP header of the foregoing DNS response packet 320 is the same as the destination IP address 312 in the IP header of the foregoing DNS query packet 310.

(3) The destination IP address 322 in the IP header of the foregoing DNS response packet 320 is the same as the source IP address 311 in the IP header of the foregoing DNS query packet 310.

(4) The source port number 323 in the UDP header of the foregoing DNS response packet 320 is the same as the destination port number 314 in the UDP header of the foregoing DNS query packet 310.

(5) The destination port number 324 in the UDP header of the foregoing DNS response packet 320 is the same as the source port number 313 in the UDP header of the foregoing DNS query packet 310.

The determination condition at Step S706 is that the extracted information temporary table 621 includes an entry of an extracted information packet generated from an HTTP request packet 300 that is received in the same timeslot as the HTTP request packet 330 and includes the same HOST 308 as the A record 315 in the foregoing DNS query packet 310.

"In the same timeslot" means within a predetermined time difference. The predetermined time difference is a value considered to be the difference in time of reception of a packet in end-to-end communication between the sensor 50 and the sensor 51, which can be a time difference larger than the sum of the time required for the proxy (the packet relay apparatus 20 in this embodiment) to send a query to and receive a response from the DNS server 40 and the time required for the proxy to issue a packet to the WWW server 30.

If not determining that the extracted information can be assembled to a record of end-to-end communication (in other words, at least one of the results at Steps S704, S705, and S706 is No), the extracted information analyzer 611 terminates the processing to analyze the extracted information.

If determining that the extracted information can be assembled to a record of end-to-end communication is available (in other words, all results at Steps S704, S705, and S706 are Yes), the extracted information analyzer 611 stores the following ten values to the end-to-end communication table 622 as one entry (S707):

(1) The time of reception of the HTTP request packet 330 as a value of the time of web access, (2) The source IP address 303 in the IP header of the HTTP request packet 300 as a value of the source IP address, (3) The source MAC address 301 in the Ether header of the HTTP request packet 300 as a value of the source MAC address, (4) The source IP address 331 in the IP header of the HTTP request packet 330 as a value of the proxy IP address, (5) The source port number 333 in the TCP header of the HTTP request packet 330 as a value of the proxy port number, (6) The destination IP address 332 in the IP header of the HTTP request packet 330 as a value of the destination IP address, (7) The HOST 336 in the HTTP header of the HTTP request packet 330 as a value of the destination host name, (8) The destination port number 334 in the TCP header of the HTTP request packet 330 as a value of the destination host port number, (9) The GET 335 in the HTTP header of the HTTP request packet 330 as a value of the destination URL, and

(10) The value "HTTP" as a value of the kind of communication.

The extracted information analyzer 611 can store additional information such as a User-Agent to the end-to-end communication table 622, if the extracted information packets include such information.

The extracted information analyzer 611 can be configured to check at least one of the conditions in Steps S704, S705, and S706, instead of checking all, and proceed to Step S707 if the at least one condition is satisfied.

As understood from the above description, the monitoring apparatus 60 identifies end-to-end communication from extracted information packets including limited information extracted from the packets being monitored and stores information on the identified end-to-end communication.

The extracted information analyzer 611 starts determining whether extracted information can be assembled to a record of end-to-end communication with the determination conditions in Steps S704 to S706 upon determining at Step S703 that an extracted information packet representing an HTTP request packet 330 is received; however, the extracted information analyzer 611 can be configured to determine whether extracted information can be assembled into information on end-to-end communication in a batch (for example, upon determining that a predetermined number of extracted information packets are received).

FIG. 8 is a configuration example of a search screen for conducting an end-to-end communication search to be displayed on the search viewer terminal 70. The search screen is to receive input of conditions to search for an entry in the end-to-end communication table 622.

The search screen includes input fields to input, for example, a web access time, the IP/port number of a terminal, the MAC address of a terminal, the IP/port number of a terminal, the IP/port number of a destination, the host name/port number of a destination, and the URL of a destination as search conditions. The search screen further includes a field to input the kind of communication as a search condition because Embodiment 2 to be described later handles not only HTTP communication but also HTTPS communication in registering communication to the end-to-end communication table 622.

If other information such as User-Agent is registered in the end-to-end communication table 622, the search screen can further include an input field to input the other information as a search condition. Although FIG. 8 provides a configuration example of a screen, a search can be conducted through an application programming interface (API) that accepts input of search conditions listed in FIG. 8.

Figure 9:
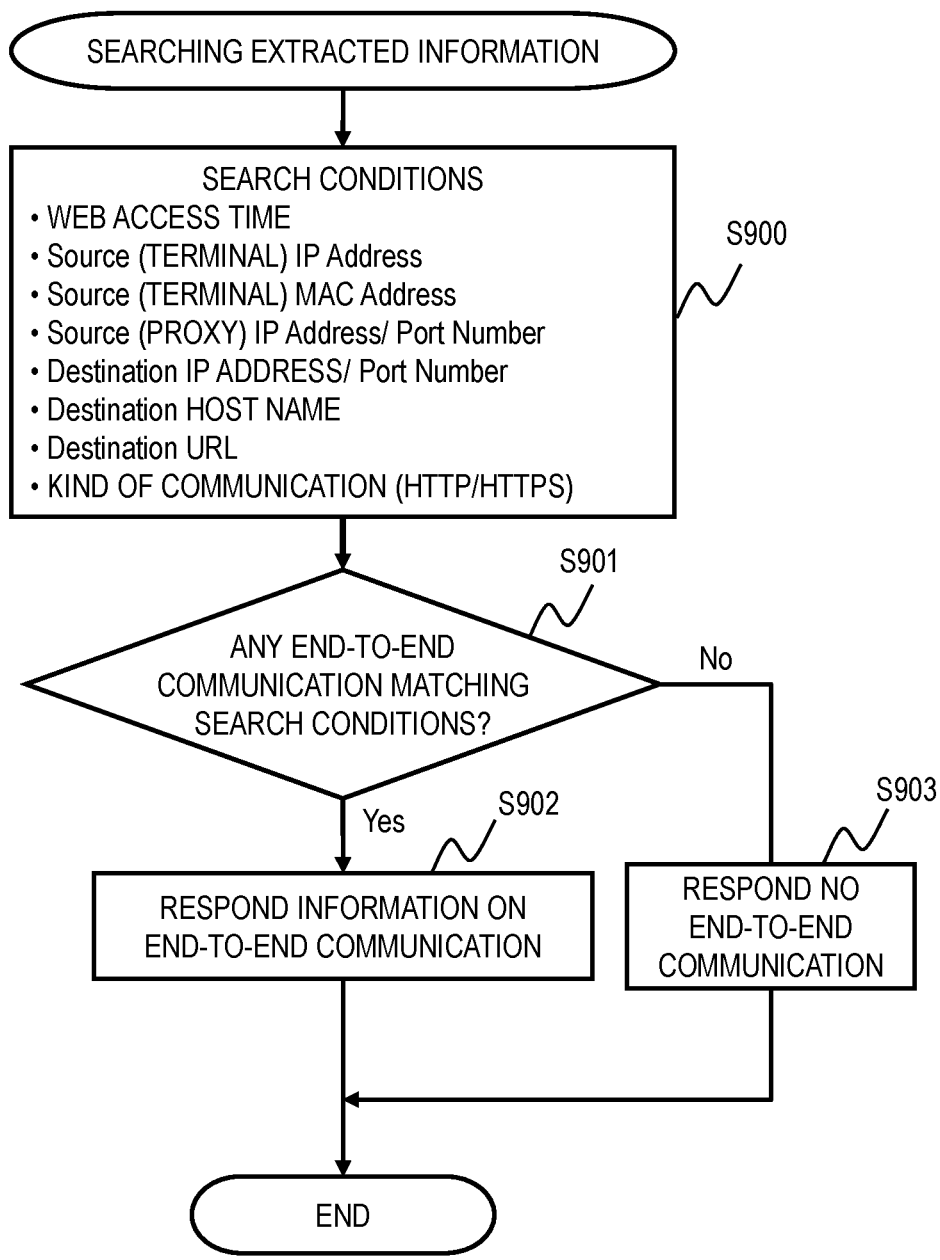
FIG. 9 is a flowchart of an example of extracted information search processing according to embodiment 1.

FIG. 9 is a flowchart of an example of extracted information search processing to extract a result of an end-to-end communication search.

The search information packet receiver/sender 613 receives a search condition packet from the search viewer terminal 70. The extracted information searcher 612 acquires the search conditions specified by the search condition packet (S900).

The search conditions can be the web access time, the IP/port number of the terminal, the MAC address of the terminal, the IP/port number of the proxy, the IP/port number of the destination, the host name/port number of the destination, the URL of the destination, and/or the kind of the communication in the example of the search screen illustrated in FIG. 8.

The extracted information searcher 612 determines whether the end-to-end communication table 622 includes an entry matching the search conditions (whether end-to-end communication matching the search conditions is conducted) (S901).

If determining that an entry matching the search condition exists (S901: Yes), the extracted information searcher 612 acquires the entry representing the end-to-end communication as a search result and the search information packet receiver/sender 613 generates a search result packet including the search result and sends the search result packet to the search viewer terminal 70 (S902).

If not determining that an entry matching the search condition exists (S901: No), the search information packet receiver/sender 613 generates a search result packet indicating that no corresponding end-to-end communication exists and sends the search result packet to the search viewer terminal 70 (S903).

FIG. 10 is a configuration example of a screen for displaying a result of the end-to-end communication search. This screen is displayed on an output device included in (or connected with) the search viewer terminal 70.

FIG. 10 provides an example of the screen when the extracted information search processing has found end-to-end communication matching the search conditions. The screen displays values of the entry of the end-to-end communication table 622 that matches the search conditions. As shown in FIG. 10, this screen displays end-to-end communication obtained by integrating the part of the communication in the downstream network and the part of the communication in the upstream network. The user of the search viewer terminal 70 can easily locate the source of the packet.

If the end-to-end communication table 622 includes more information such as User-Agent, more complex end-to-end communication search is available by including the information in the search conditions and displaying the information in a search result. Although the monitoring apparatus 60 in this embodiment monitors packets, the monitoring apparatus 60 can be configured to monitor data in a different layer such as frames.

Embodiment 2

Embodiment 2 describes an example where HTTPS communication is registered and searched, whereas Embodiment 1 describes an example where HTTP communication is registered and searched.

Embodiment 2 describes an example that mirrors HTTPS communication upstream and downstream of a proxy, extracts information with sensors, and stores information on end-to-end communication in a searchable form with a monitoring apparatus to allow the initiator (source) of the communication to be located easily. Hereinafter, description about the same configurations as Embodiment 1 is omitted and differences from Embodiment 1 are described.

Figure 11:
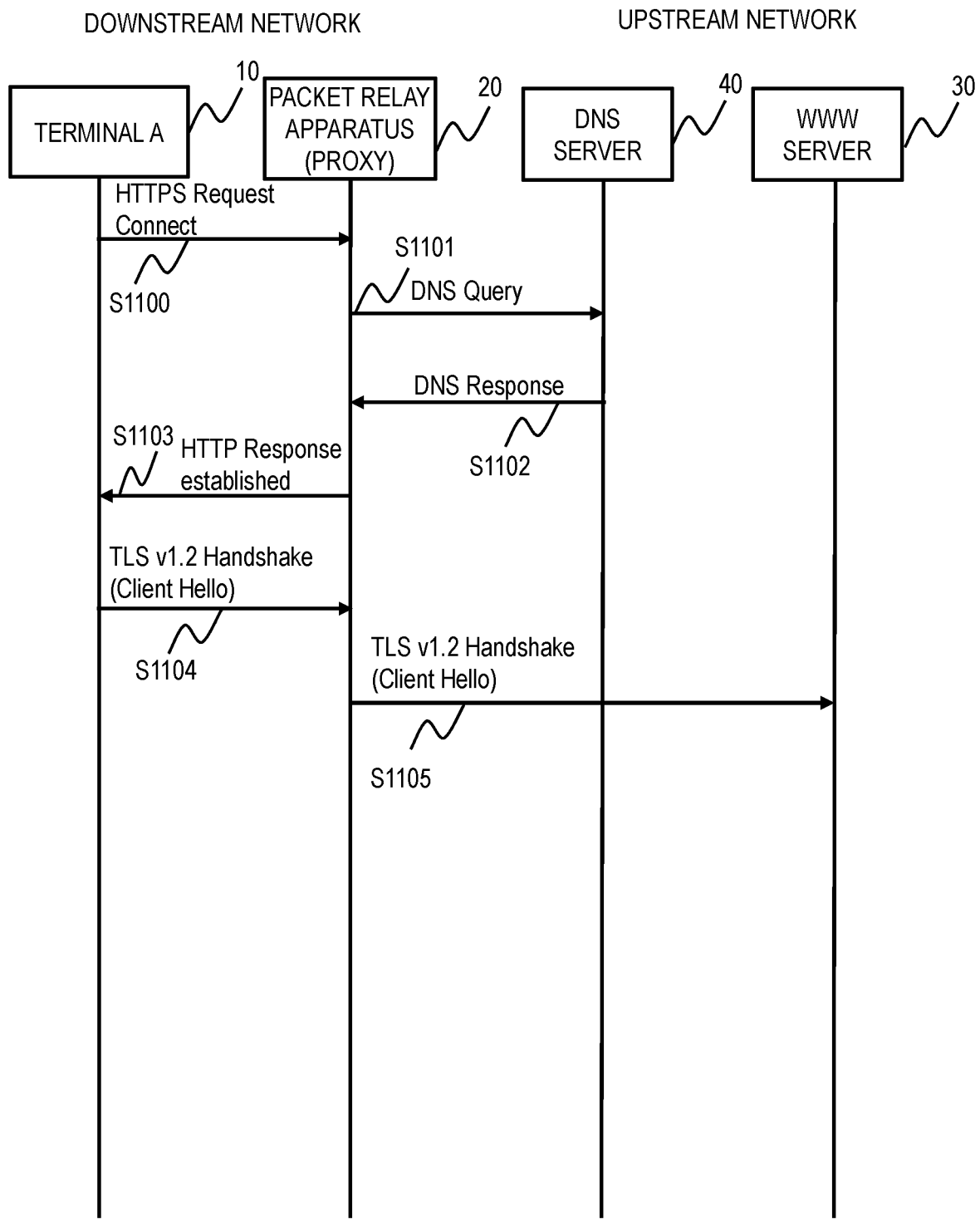
FIG. 11 is a sequence diagram illustrating an example of a flow of HTTPS communication according to embodiment 2.

FIG. 11 is a sequence diagram illustrating an example of a flow of HTTPS communication. FIG. 11 illustrates an example of HTTPS communication from the terminal 10 to the WWW server 30 in the system illustrated in FIG. 1. The packet format in each transmission will be described later with reference to FIG. 12.

In starting HTTPS communication, the terminal 10 sends an HTTPS request to the packet relay apparatus 20 and the packet relay apparatus 20 receives the HTTPS request (S1100).

The packet relay apparatus 20 generates a DNS query by setting the host information of the WWW server 30 to the A record based on the host information in the HTTP header of the received HTTPS request and sends the generated DNS query to the DNS server 40 in order to find out the IP address of the WWW server 30 of the destination. The DNS server 40 receives the DNS query (S1101).

The DNS server 40 generates a DNS response including the IP address corresponding to the host information in the A record and sends the generated DNS response to the packet relay apparatus 20 in order to respond the IP address of the host specified by the DNS query. The packet relay apparatus 20 receives the DNS response (S1102).

The packet relay apparatus 20 sends an HTTPS response to the terminal 10 of the HTTPS requestor. The terminal 10 receives the HTTPS response and enters TLS communication (S1103).

The terminal 10 sends a TLS v1.2 handshake (Client Hello, hereinafter, also referred to as a TLS message) to the packet relay apparatus 20 in order to start TLS communication. The packet relay apparatus 20 receives the TLS v1.2 handshake (Client Hello) (S1104).

The packet relay apparatus 20 replaces the IP header and the TCP header of the TLS message received at Step S1104 and sends it to the WWW server 30 of the destination. The WWW server 30 receives the TLS message including the replaced IP header and TCP header (S1105). A series of HTTPS communication is completed with this step.

FIGS. 12A and 12B are examples of the formats of the packets in HTTPS communication to be extracted by the sensors 50 and 51. FIGS. 12A and 12B include only the minimum requirements for the explanation of this embodiment among the headers and methods/fields included in the packets. The packet formats of the DNS query to be sent at Step S1101 and the DNS response to be sent at Step S1102 are the same as the packets format in FIGS. 3B and 3C, respectively, and therefore, explanation thereof is omitted here.

FIG. 12A is an example of the format of a part of an Https request packet to be sent from the terminal 10 to the packet relay apparatus 20 at Step S1100. The HTTPS request packet 1200 includes an Ether header, an IP header, a TCP header, and an HTTP header.

The Ether header of the HTTPS request packet 1200 includes a source MAC address 1201 and a destination MAC address 1202. The IP header of the HTTPS request packet 1200 includes a source IP address 1203 and a destination IP address 1204.

The TCP header of the HTTPS request packet 1200 includes a source port number 1205 and a destination port number 1206. The HTTP header of the HTTPS request packet 1200 includes a CONNECT 1207 and a HOST 1208.

The HTTPS request packet 1200 includes the HOST 1208 as described above, but unlike the HTTP request packet 300 illustrated in FIG. 3A, it does not include a URL.

FIG. 12B is an example of the format of a part of a TLS message packet to be sent from the packet relay apparatus 20 to the WWW server 30 at Step S1105. The TLS message packet 1230 includes an Ether header, an IP header, a TCP header, and an SSL header.

The IP header of the TLS message packet 1230 includes a source IP address 1231 and a destination IP address 1232. The TCP header of the TLS message packet 1230 includes a source port number 1233 and a destination port number 1234. The SSL header of the TLS message packet 1230 includes the version 1235 of TLS/SSL.

Figure 13:
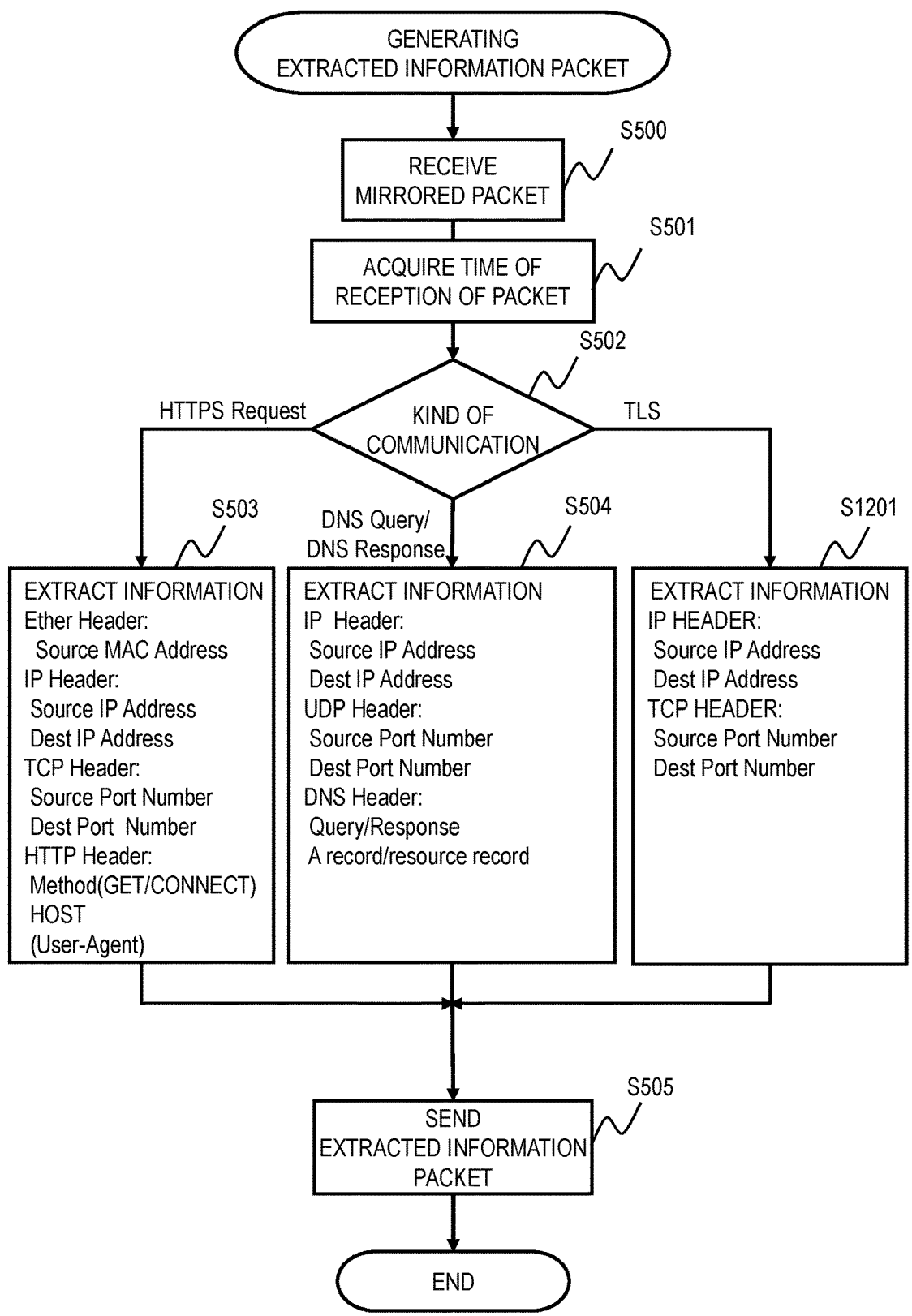
FIG. 13 is a flowchart of an example of processing of generating an extracted information packet according to embodiment 2.

FIG. 13 is a flowchart of an example of processing of the sensor 50 in this embodiment to generate an extracted information packet. Differences from FIG. 5 are described. If determining that the kind of communication of the received packet is TLS message (S502: TLS), the information extractor 511 extracts TLS information (S1201). The information extractor 511 extracts the source IP address 1231 and the destination IP address 1232 in the IP header, the source port number 1233 and the destination port number 1234 in the TCP header from the received packet in extracting TLS inform APPARATUS ation at Step S1201. Upon completion of the extraction at the information extractor 511, the processing proceeds to Step S505.

Figure 14:
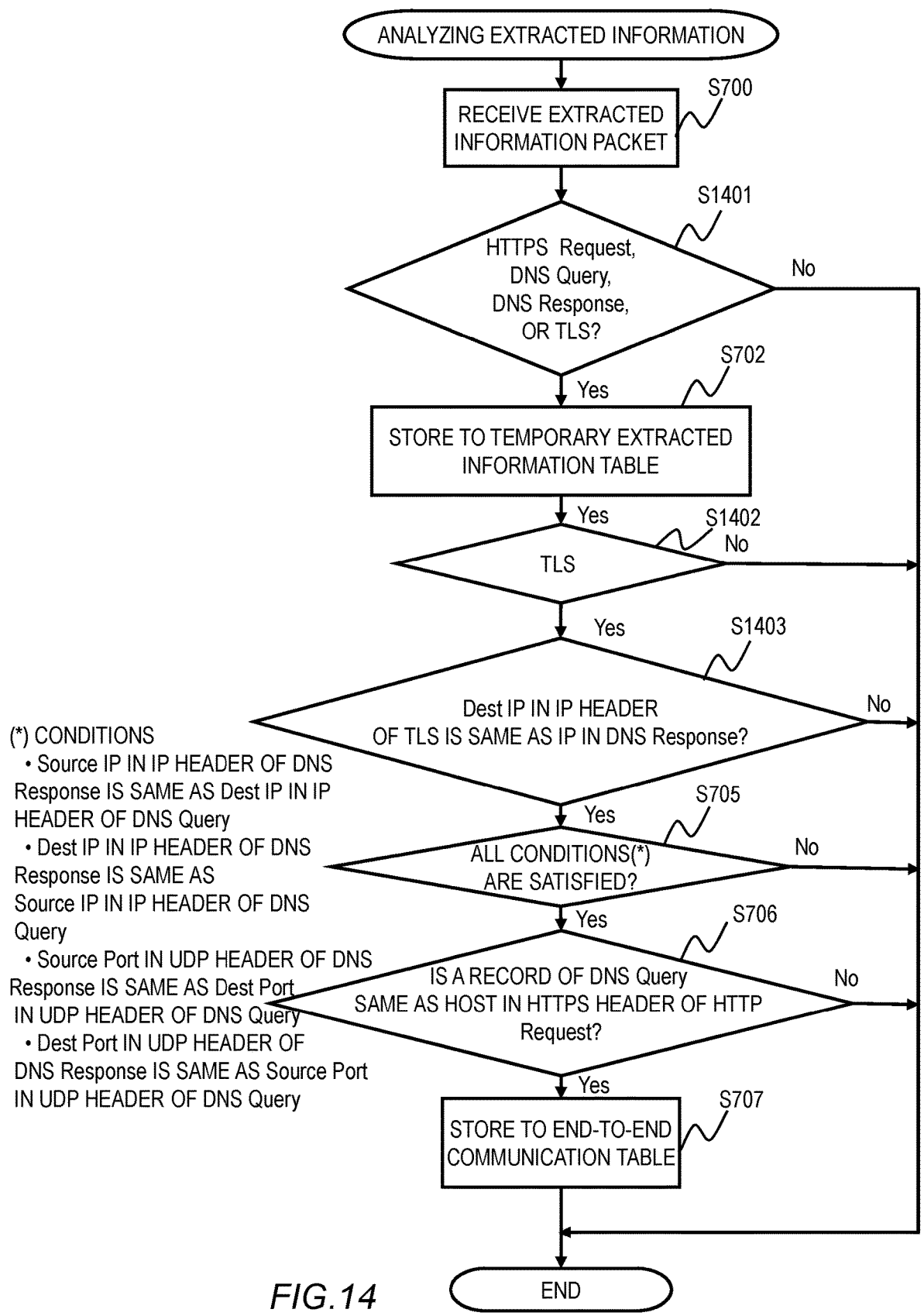
FIG. 14 is a flowchart of an example of processing of analyzing extracted information according to embodiment 2.

FIG. 14 is a flowchart of an example of processing of the monitoring apparatus 60 in this embodiment to analyze extracted information. In the example of FIG. 14, information extracted from HTTPS communication is analyzed. The processing in FIG. 14 is performed by replacing the HTTP request packet 300 in FIG. 7 with an HTTPS request packet 1200 and the HTTP request packet 330 in FIG. 7 with a TLS message packet 1230 and therefore, explanation thereof is omitted here.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A monitoring apparatus configured to monitor communication in a network separated by a proxy server into a first network and a second network, the proxy server being configured to relay communication between an apparatus included in the second network and an apparatus included in the first network in accordance with a request from the apparatus in the second network, and the monitoring apparatus comprising:
a processor; and
a memory,
wherein the memory holds extracted information including:
extracted data extracted from monitoring target data used for predetermined kinds of communication in first communication between the proxy server and an apparatus in the first network and second communication between the proxy server and an apparatus in the second network; and
times of reception of the monitoring target data from which the extracted data is extracted,
wherein the extracted data includes the kinds of communication for which the monitoring target data is used, the sources and the destinations of the monitoring target data in the first communication, and the sources in the second network and the destinations in the first network after the monitoring target data is relayed by the proxy server of the monitoring target data in the second communication, and
wherein the processor is configured to:
determine whether the extracted information includes first extracted data extracted from monitoring target data used for first kind of communication in the first communication;
acquire second extracted data extracted from monitoring target data in the second communication whose time of reception is within a predetermined time difference from the time of reception of the first extracted data with reference to the extracted information, in a case of determining that the extracted information includes the first extracted data; and
determine whether communication using the monitoring target data from which the acquired second extracted data is extracted is included in a series of end-to-end communication, based on the source and the destination indicated by the first extracted data and the destination in the first network indicated by the acquired second extracted data; and
the monitoring apparatus further comprising a sensor,
wherein the sensor is configured to acquire the monitoring target data and the times of reception of the monitoring target data, and
wherein the processor is configured to:
generate the extracted data by extracting the kinds of communication for which the monitoring target data is used, the sources and the destinations of the monitoring target data in the first communication, and the destinations in the first network after the monitoring target data is relayed by the proxy server of the monitoring target data in the second communication, from the monitoring target data; and
include the generated extracted data and the times of reception acquired by the sensor into the extracted information.

2. The monitoring apparatus according to claim 1,
wherein the predetermined kinds of communication include:
first HTTP request and DNS query to be sent by the proxy server in the first communication;
DNS response to be received by the proxy server in the first communication; and
second HTTP request to be received by the proxy server in the second communication, wherein the first kind of communication is the first HTTP request,
wherein the processor is configured to:
conduct matching determination on a packet for the DNS query, a packet for the DNS response, and a packet for the second HTTP request that are received within the predetermined time difference from the time of reception of a packet for the first HTTP request; and
determine that communication of the packet for the second HTTP request is included in a series of end-to-end communication, in a case where all kinds of matching determination result in affirmative, and
wherein the matching determination includes at least one of the following kinds of matching determination:
first matching determination to determine whether the destination of the packet for the first HTTP request is the same as the destination in the first network specified by the packet for the DNS response;
second matching determination to determine whether the source of the packet for the DNS response is the same as the destination of the packet for the DNS query;
third matching determination to determine whether the destination of the packet for the DNS response is the same as the source of the packet for the DNS query; and
fourth matching determination to determine whether the destination in the first network specified by the packet for the DNS query is the same as the destination in the first network specified by the packet for the second HTTP request.

3. The monitoring apparatus according to claim 2, wherein the processor in the first matching determination is configured to determine whether the destination IP address of the packet for the first HTTP request is the same as the destination IP address in the first network specified by the packet for the DNS response.

4. The monitoring apparatus according to claim 2,
wherein the processor in the second matching determination is configured to determine:
whether the source IP address of the packet for the DNS response is the same as the destination IP address of the packet for the DNS query; and
whether the source port number of the packet for the DNS response is the same as the destination port number of the packet for the DNS query, and
wherein the processor in the third matching determination is configured to determine:
whether the destination IP address of the packet for the DNS response is the same as the source IP address of the packet for the DNS query; and
whether the destination port number of the packet for the DNS response is the same as the source port number of the packet for the DNS query.

5. The monitoring apparatus according to claim 2, wherein the processor in the fourth matching determination is configured to determine whether the A record in the packet for the DNS query is the same as the HOST in the packet for the second HTTP request.

6. The monitoring apparatus according to claim 1,
wherein the predetermined kinds of communication include:
TLS message and DNS query to be sent by the proxy server in the first communication;
DNS response to be received by the proxy server in the first communication; and HTTP request to be received by the proxy server in the second communication,
wherein the first kind of communication is the TLS message,
wherein the processor is configured to:
conduct matching determination on a packet for the DNS query, a packet for the DNS response, and a packet for the HTTP request that are received within the predetermined time difference from the time of reception of a packet for the TLS message; and
determine that communication of the packet for the HTTP request is included in a series of end-to-end communication, in a case where all kinds of matching determination result in affirmative, and
wherein the matching determination includes at least one of the following kinds of matching determination:
first matching determination to determine whether the destination of the packet for the TLS message is the same as the destination in the first network specified by the packet for the DNS response;
second matching determination to determine whether the source of the packet for the DNS response is the same as the destination of the packet for the DNS query;
third matching determination to determine whether the destination of the packet for the DNS response is the same as the source of the packet for the DNS query; and
fourth matching determination to determine whether the destination in the first network specified by the packet for the DNS query is the same as the destination in the first network specified by the packet for the HTTP request.

7. The monitoring apparatus according to claim 6, wherein the processor in the first matching determination is configured to determine whether the destination IP address of the packet for the TLS message is the same as the destination IP address in the first network specified by the packet for the DNS response.

8. The monitoring apparatus according to claim 6,
wherein the processor in the second matching determination is configured to determine:
whether the source IP address of the packet for the DNS response is the same as the destination IP address of the packet for the DNS query; and
whether the source port number of the packet for the DNS response is the same as the destination port number of the packet for the DNS query, and
wherein the processor in the third matching determination is configured to determine:
whether the destination IP address of the packet for the DNS response is the same as the source IP address of the packet for the DNS query; and
whether the destination port number of the packet for the DNS response is the same as the source port number of the packet for the DNS query.

9. The monitoring apparatus according to claim 6, wherein the processor in the fourth matching determination is configured to determine whether the A record in the packet for the DNS query is the same as the HOST in the packet for the HTTP request.

10. The monitoring apparatus according to claim 1,
wherein the monitoring apparatus is connected with a display device,
wherein the extracted data includes the sources of the monitoring target data in the first communication, and
wherein the processor is configured to display the destination in the first network of the monitoring target data corresponding to the first extracted data and the source of the monitoring target data corresponding to the second extracted data on the display device, in a case of determining that communication using the monitoring target data from which the acquired second extracted data is included in a series of end-to-end communication.

11. A monitoring method by a monitoring apparatus configured to monitor communication in a network separated by a proxy server into a first network and a second network,
the proxy server being configured to relay communication between an apparatus included in the second network and an apparatus included in the first network in accordance with a request from the apparatus in the second network, and
the monitoring apparatus holds extracted information including:
extracted data extracted from monitoring target data used for predetermined kinds of communication in first communication between the proxy server and an apparatus in the first network and second communication between the proxy server and an apparatus in the second network; and
times of reception of the monitoring target data from which the extracted data is extracted,
wherein the extracted data includes the kinds of communication for which the monitoring target data is used, the sources and the destinations of the monitoring target data in the first communication, and the sources in the second network and the destinations in the first network after the monitoring target data is relayed by the proxy server of the monitoring target data in the second communication, and
the monitoring method is configured to:
by the monitoring apparatus, determine whether the extracted information includes first extracted data extracted from monitoring target data used for first kind of communication in the first communication;
by the monitoring apparatus, acquire second extracted data extracted from monitoring target data in the second communication whose time of reception is within a predetermined time difference from the time of reception of the first extracted data with reference to the extracted information, in a case of determining that the extracted information includes the first extracted data;
by the monitoring apparatus, determine whether communication using the monitoring target data from which the acquired second extracted data is extracted is extracted is included in a series of end-to-end communication, based on the source and the destination indicated by the first extracted data and the destination in the first network indicated by the acquired second extracted data;
by the monitoring apparatus, acquire the monitoring target data and the times of reception of the monitoring target data, and
by the monitoring apparatus, generate the extracted data by extracting the kinds of communication for which the monitoring target data is used, the sources and the destinations of the monitoring target data in the first communication, and the destinations in the first network after the monitoring target data is relayed by the proxy server of the monitoring target data in the second communication, from the monitoring target data; and by the monitoring apparatus, include the generated extracted data and the times of reception acquired by the sensor into the extracted information.

12. A computer-readable non-transitory storage medium having stored thereon a program for causing a monitoring apparatus to monitor communication in a network separated by a proxy server into a first network and a second network, the proxy server being configured to relay communication between an apparatus included in the second network and an apparatus included in the first network in accordance with a request from the apparatus in the second network, and the monitoring apparatus holds extracted information including:

extracted data extracted from monitoring target data used for predetermined kinds of communication in first communication between the proxy server and an apparatus in the first network and second communication between the proxy server and an apparatus in the second network; and times of reception of the monitoring target data from which the extracted data is extracted, wherein the extracted data includes the kinds of communication for which the monitoring target data is used, the sources and the destinations of the monitoring target data in the first communication, and the sources in the second network and the destinations in the first network after the monitoring target data is relayed by the proxy server of the monitoring target data in the second communication, and the program causing the monitoring apparatus to execute:

determining whether the extracted information includes first extracted data extracted from monitoring target data used for first kind of communication in the first communication;

acquiring second extracted data extracted from monitoring target data in the second communication whose time of reception is within a predetermined time difference from the time of reception of the first extracted data with reference to the extracted information, in a case of determining that the extracted information includes the first extracted data;

determining whether communication using the monitoring target data from which the acquired second extracted data is extracted is included in a series of end-to-end communication, based on the source and the destination indicated by the first extracted data and the destination in the first network indicated by the acquired second extracted data;

acquiring the monitoring target data and the times of reception of the monitoring target data, and generating the extracted data by extracting the kinds of communication for which the monitoring target data is used, the sources and the destinations of the monitoring target data in the first communication, and the destinations in the first network after the monitoring target data is relayed by the proxy server of the monitoring target data in the second communication, from the monitoring target data; and including the generated extracted data and the times of reception acquired by the sensor into the extracted information.

* * * * *